United States Patent
Jensen

(10) Patent No.: US 9,145,661 B1
(45) Date of Patent: Sep. 29, 2015

(54) WORKSITE CONTROL SYSTEM FOR MANAGING LOST LOADS

(71) Applicant: Caterpillar Inc., Peoria, IL (US)

(72) Inventor: Jeffrey Edward Jensen, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/495,548

(22) Filed: Sep. 24, 2014

(51) Int. Cl.
*G06F 7/70* (2006.01)
*E02F 9/26* (2006.01)

(52) U.S. Cl.
CPC .............. *E02F 9/267* (2013.01); *E02F 9/261* (2013.01)

(58) Field of Classification Search
USPC .......................................................... 701/50
See application file for complete search history.

(56) References Cited

U.S. PATENT DOCUMENTS

| | | | |
|---|---|---|---|
| 5,719,771 A | 2/1998 | Buck et al. | |
| 7,113,852 B2 | 9/2006 | Kapadia et al. | |
| 7,202,776 B2 * | 4/2007 | Breed | 340/435 |
| 7,594,441 B2 | 9/2009 | Gudat et al. | |
| 7,864,066 B2 * | 1/2011 | Kriel et al. | 340/673 |
| 8,688,332 B2 * | 4/2014 | Reiners et al. | 701/50 |
| 2006/0220842 A1 * | 10/2006 | Breed | 340/539.13 |
| 2009/0084173 A1 * | 4/2009 | Gudat et al. | 73/146 |
| 2011/0172973 A1 * | 7/2011 | Richards et al. | 703/2 |
| 2013/0284535 A1 * | 10/2013 | Eick et al. | 181/114 |
| 2014/0089054 A1 * | 3/2014 | Knapp et al. | 705/7.35 |

FOREIGN PATENT DOCUMENTS

| | | |
|---|---|---|
| CN | 201368760 | 12/2009 |
| CN | 102353433 | 2/2012 |
| CN | 103175599 | 6/2013 |

* cited by examiner

*Primary Examiner* — Hussein A. Elchanti
(74) *Attorney, Agent, or Firm* — Finnegan, Henderson, Farabow, Garrett & Dunner, LLP

(57) ABSTRACT

A control system is disclosed for a worksite. The control system may have a sensor located onboard a haul machine to generate a first signal indicative of a load of material lost, and a locating device to generate a second signal indicative of a location of the haul machine. The control system may also have a controller configured to determine a location at which the load of material was lost based on the first and second signals, and to determine a quantity of the load of material. The controller may also be configured to determine a repair needed at the worksite, to calculate a value of performing the repair, and to selectively dispatch a cleanup machine to perform the repair or to move the load of material to a stockpile location based on the value.

20 Claims, 3 Drawing Sheets

WORKSITE CONTROL SYSTEM FOR MANAGING LOST LOADS

TECHNICAL FIELD

The present disclosure relates generally to a worksite control system and, more particularly, to a worksite control system for managing lost loads.

BACKGROUND

Machines such as haul trucks, wheel loaders, scrapers, and other types of heavy equipment, are used to perform a variety of tasks. Some of these tasks involve carrying large, awkward, loose, and/or heavy loads along rough and uneven roadways. And because of the size of the machines and/or poor visibility provided to operators of the machines, these tasks can be difficult to complete effectively. In fact, it is not uncommon for part of the load to fall from the machine along its travel route. This lost load may or may not be noticed by an operator of the machine, and the operator may be unable to reload the material or clear the roadway without help from another machine and operator. A lost load can result in low productivity and efficiency, as well as the potential obstruction of roadways.

One attempt to manage lost loads is described in U.S. Pat. No. 7,594,441 (the '441 patent) that issued to Gudat et al. on Sep. 29, 2009. In particular, the '441 patent describes an automated lost load response system for a machine. The response system has a first sensor situated to detect the contour of a road surface forward of the machine, and a second sensor situated to detect the contour of the road surface rearward of the machine. The response system also has a controller that determines if a portion of a load carried by the machine is lost based on a comparison of signals from the first and second sensors. The controller further determines a location of the lost load, and whether the lost load is potentially hazardous based on a height and/or size of the lost load. The controller then provides a load loss warning to a service facility, which may then arrange for cleanup, salvage, or repair necessitated by the lost load.

Although the response system of the '441 patent may effectively determine when a load is lost from a machine, it may do little to resolve the situation. In particular, the solution to the lost load may still need to be determined manually and without all of the information required to do so effectively.

The disclosed worksite control system is directed to overcoming one or more of the problems set forth above and/or other problems of the prior art.

SUMMARY

In one aspect, the present disclosure is directed to a control system for a worksite at which a haul machine and at least one cleanup machine are located. The control system may include at least one sensor located onboard the haul machine and configured to generate a first signal indicative of a load of material lost from the haul machine, and a locating device configured to generate a second signal indicative of a location of the haul machine at the worksite. The control system may also include a controller in communication with the at least one sensor and the locating device. The controller may be configured to determine a location at which the load of material was lost from the haul machine based on the first and second signals, and to determine a quantity of the load of material lost from the haul machine. The controller may also be configured to determine a repair needed at the worksite, to calculate a value of performing the repair, and to selectively dispatch the at least one cleanup machine to perform the repair or to move the load of material lost from the haul machine to a stockpile location based on the value of the repair.

In another aspect, the present disclosure is directed to another control system for a worksite at which a haul machine and at least one cleanup machine are located. The control system may include at least one sensor located onboard the haul machine and configured to generate a first signal indicative of a load of material lost from the haul machine, a first locating device configured to generate a second signal indicative of a location of the haul machine at the worksite, and a second locating device configured to generate a third signal indicative of a location of the at least one cleanup machine. The control system may also include a controller in communication with the at least one sensor, the first locating device, and the second locating device. The controller may be configured to determine that the load of material has been lost from the haul machine based on the first signal, to determine a location at which the load of material was lost from the haul machine based on the second signal, and to determine a quantity of the load of material lost from the haul machine. The controller may also be configured to determine a repair needed at the worksite, to determine an availability of the at least one cleanup machine to perform the repair or to move the load of material, to calculate a value of performing the repair, and to determine a cost of the repair. The controller may also be configured to selectively dispatch the at least one cleanup machine to perform the repair only when the quantity of the load of material lost from the haul machine is greater than a threshold quantity, the at least one cleanup machine is available, and the value of the repair is greater than the cost of the repair by at least a desired margin. The controller may further be configured to selectively dispatch the at least one cleanup machine to move the load of material lost from the haul machine to a stockpile location when the quantity of the load of material lost from the haul machine is less than the threshold quantity, the at least one cleanup machine is unavailable, or the value of the repair is less than the cost of the repair plus the desired margin. The repair may require material transported by the haul machine.

In yet another aspect, the present disclosure is directed to a method of managing a worksite. The method may include determining that a load of material has been lost from a haul machine, determining a location at which the load of material was lost from the haul machine, and determining a quantity of the load of material lost from the haul machine. The method may also include determining a repair needed at the worksite, calculating a value of performing the repair, and selectively dispatching a cleanup machine to perform the repair or to move the load of material lost from the haul machine to a stockpile location based on the value of the repair.

DETAILED DESCRIPTION

Figure 1:
FIG. 1 is a pictorial illustration of an exemplary disclosed worksite.

FIG. 1 illustrates an exemplary worksite 10 having multiple, simultaneously-operable machines 12 performing a variety of predetermined tasks. Worksite 10 may include, for example, a mine site, a landfill, a quarry, a construction site, or any other type of worksite known in the art. The predetermined tasks may be associated with altering the current geography at worksite 10 and include a clearing operation, a leveling operation, a hauling operation, a digging operation, a loading operation, a dumping operation, or any other type of operation that functions to alter the current geography at worksite 10.

Worksite 10 may include multiple locations designated for particular purposes. For example, a first location 14 may be designated as a load location, at which a first cleanup machine 12a operates to fill haul machines 12b with material. A second location 16 may be designated as a dump and/or stockpile location, at which haul machines 12b discharge their payloads. Haul machines 12b may follow a travel path 18 that generally extends between load and dump locations 14, 16.

One or more additional cleanup machines 12c, 12d (e.g., a dozing machine, a grading machine, or another type of cleanup machine) at worksite 10 may be selectively dispatched to clear or level load location 14, dump location 16, and/or travel path 18 such that travel by other machines 12 at these locations may be improved. Each of cleanup machines 12a, 12c, 12d may have a different capability for moving material and/or a different cost associated with its operation. As machines 12 move about worksite 10, the shapes, dimensions, and general positions of load location 14, dump location 16, and/or travel path 18 may change. Similarly, the locations of cleanup machines 12a, 12c, 12d may also change, as well as a time and a cost required for cleanup machines 12a, 12c, 12d to reach the different locations when dispatched. Machines 12 may be self-directed machines configured to autonomously traverse the changing terrain of worksite 10, manned machines configured to traverse worksite 10 under the control of an operator, or hybrid machines configured to perform some functions autonomously and other functions under the control of an operator.

During operation of machines 12 at worksite 10, the movements and operations performed by machines 12 may be monitored. In particular, a central controller 20 located at a service facility 22 (or elsewhere at worksite 10) may communicate with machines 12 to track their movements and their operations. As will be explained in more detail below, central controller 20 may be configured to detect when a load of material has been lost from a particular haul machine 12b during travel along path 18 and/or during loading at location 14, and to selectively dispatch a particular cleanup machine 12a, 12c, 12d to respond to the loss.

Central controller 20 may include means for monitoring, recording, storing, indexing, processing, communicating and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

In one embodiment, an electronic map of worksite 10 may be stored in the memory of central controller 20. The map may be updated in real time to reflect the locations of machines 12, the locations of any material lost during operations of machines 12, and conditions of worksite 10 (e.g., the locations and severity of potholes, ruts, depressed areas, or washouts at load location 14, dump location 16, and/or travel route 18) that are in need of repair. Information about worksite 10 contained within the map may be input manually (e.g., via survey and/or operator observation) or automatically received from machines 12 (e.g., via onboard sensors). The map may be used by central controller 20 to reroute a particular machine 12 to avoid a lost load or, alternatively, to dispatch a cleanup machine 12a, 12c, 12d to clear away the lost load or provide the necessary repair. The map may be continually referenced by central controller 20 and updated by any machine 12 functioning at worksite 10.

Figure 2:
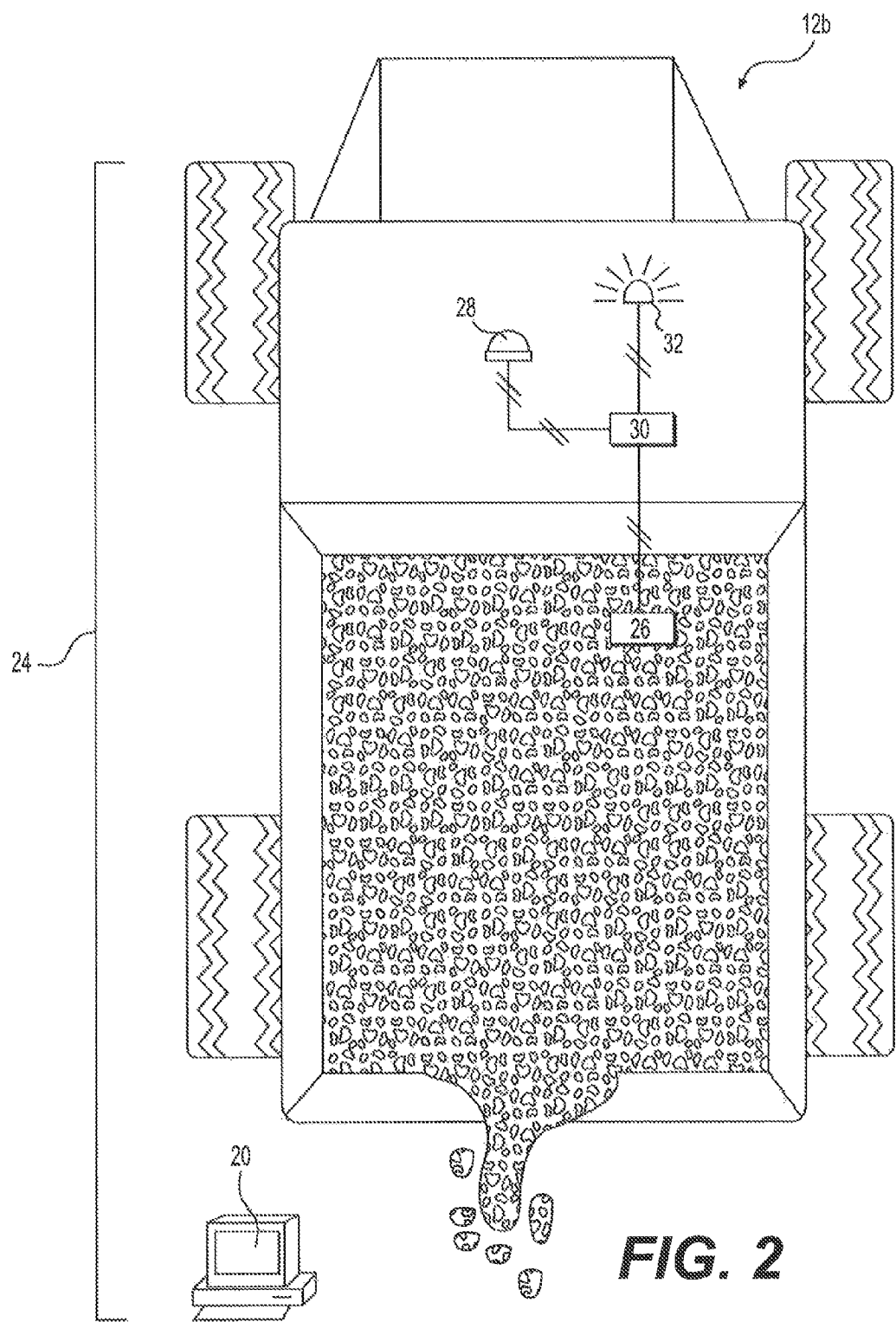
FIG. 2 is a diagrammatic illustration of an exemplary disclosed control system that may be used in conjunction with the worksite of FIG. 1.
Figure 3:
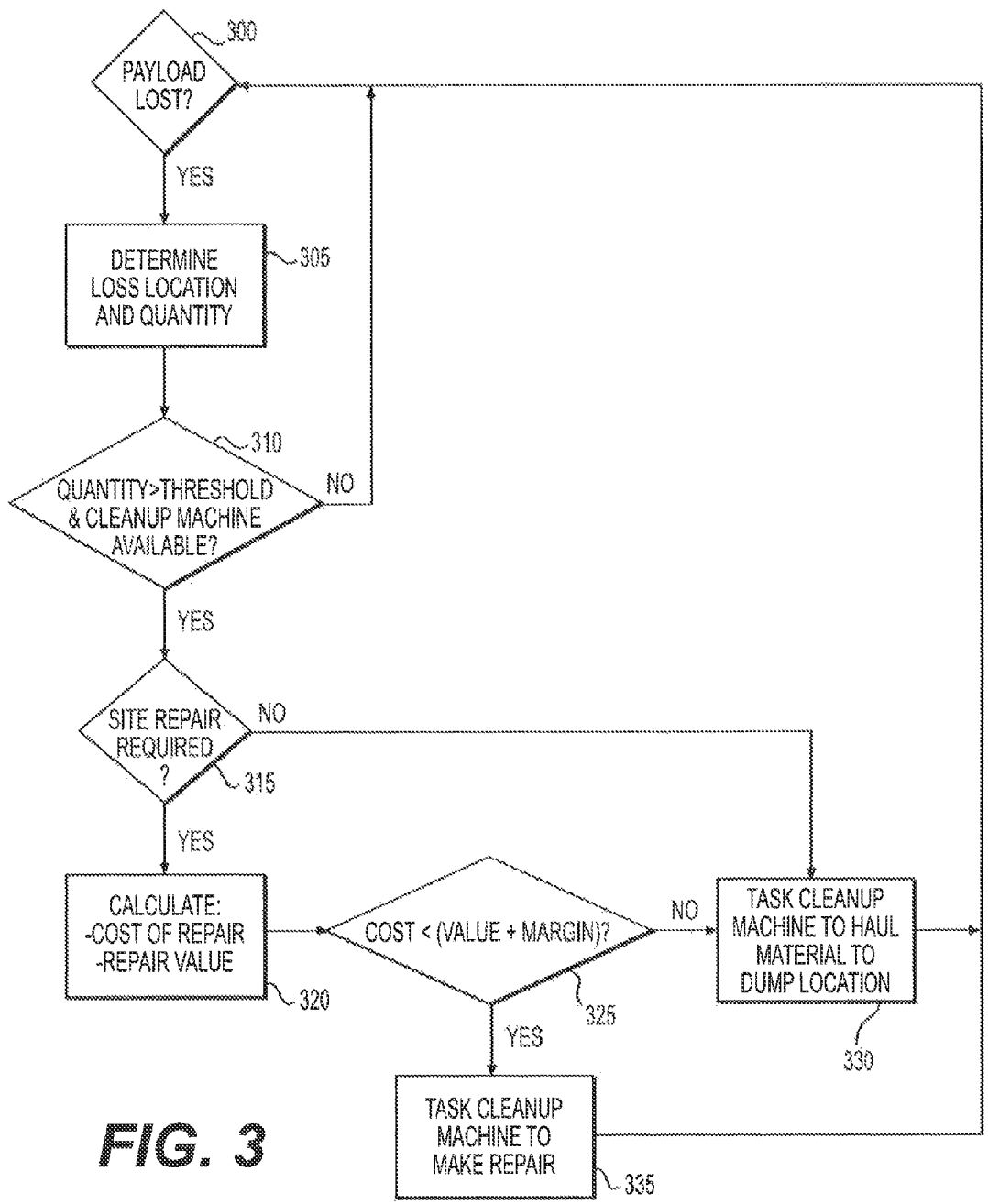
FIG. 3 is a flowchart illustrating an exemplary disclosed process that may be implemented by the control system of FIG. 2.

As shown in FIG. 2, central controller 20 may form a portion of a control system 24 that is configured to manage worksite 10. Control system 24 may also include at least one load sensor 26 located onboard each haul machine 12b, and a locating device 28 located onboard each machine 12 (i.e., onboard each haul machine 12b and onboard each cleanup machine 12a, 12c, 12d). Central controller 20 may be in communication with each of these components (e.g., via an onboard machine controller 30 and/or a transmitter 32) and configured to determine, based on signals from these components and based on other known information stored in memory, one or more of the following: when a load of material is lost from haul machine 12b (or from cleanup machine 12a during loading of haul machine 12b); how much material is lost; where exactly the material is lost (e.g., along travel route 18 or at load location 14); a value of the lost material; a location of and availability of cleanup machines 12a, 12c, 12d; a capability of cleanup machines 12a, 12c, 12d to clear the lost material; and a cost of using cleanup machines 12a, 12c, 12d to respond to the lost load. In addition, central controller 20 may be configured to determine a repair needed at worksite 10 (e.g., via reference to the electronic map stored in memory) that could benefit from the material lost from haul machine 12b and/or cleanup machine 12a, as well as a value and a cost of performing the repair. Controller 20 may then be configured to determine if the lost material should be used to make the repair, or instead taken to and/or stockpiled at dump location 16. The flowchart of FIG. 3 illustrates this process in detail and will be discussed in the following section to further illustrate the disclosed concepts.

Load sensor 26 may be any type of device known in the art for detecting that a load has been lost from cleanup machine 12a and/or haul machine 12b, and for quantifying the amount of loss. For example, load sensor 26 may embody a LIDAR (light detection and ranging) device, a RADAR (radio detection and ranging) device, a SONAR (sound navigation and ranging) device, or any other type of device that detects and ranges objects. In this example, one load sensor 26 may be located at a front end of haul machine 12b and another load sensor 26 may be located at a rear end of haul machine 12b. A comparison of signals generated by these sensors may then be used to determine an amount of material that has fallen from haul machine 12b. In another example, load sensor 26 may be a load cell, a force gauge, a pressure sensor, or any other device operable to detect a mass change in the material carried by haul machine 12b, this change indicating the amount of material that has been lost. In yet another example, a camera may be used to capture images of the material within haul machine 12b and/or an area around haul machine 12b, a change in the images being used to quantify an amount of material that has been lost. Other embodiments may also be possible, and any number of load sensors 26 may be utilized. Signals indicative of the quantity of material lost from haul machine 12b may be generated by load sensor 26 and directed (e.g., via onboard controller 30 and transmitter 32) to central controller 20 for further processing.

Locating device 28 may be configured to generate a signal indicative of a geographical position of the lost load of material relative to a local reference point, a coordinate system associated with worksite 10, a coordinate system associated with Earth, or any other type of 2-D or 3-D coordinate system. For example, locating device 28 may embody an electronic receiver configured to communicate with one or more satellites, or a local radio or laser transmitting system used to determine a relative geographical location of itself. Locating device 28 may receive and analyze high-frequency, low-power radio or laser signals from multiple locations to triangulate a relative 3-D geographical position. A signal indicative of this geographical position may then be communicated from locating device 28 through onboard controller 30 and transmitter 32 to central controller 20. The signal generated by location device 28 may then be correlated with the loss of material signal from load sensor 26, such that the location of the lost material may be determined and mapped.

It should be noted that cleanup machines 12a, 12c, 12d may also be equipped with a locating device 28, if desired. In other embodiments, the location of cleanup machines 12a, 12c, 12d may be known (e.g., manually input to controller 20 each time a location has changed) and/or tracked from an offboard location (e.g., via radar, RFID tags, or other means).

Onboard controller 30 may be configured to manage communications between haul machine 12b and central controller 20. For example, onboard controller 30 may receive signals from load sensor 26 and locating device 28, and correlate the signals, filter the signals, buffer the signals, record the signals, or otherwise condition the signals before directing the signals offboard via transmitter 32. In some embodiments, onboard controller 30 may have additional functionality, for example autonomous or semi-autonomous control functionality over haul machine 12b, if desired. A similar onboard controller 30 may be associated with cleanup machines 12a, 12c, 12d.

Transmitter 32 may be configured to facilitate communication between onboard controller 30 and central controller 20. Transmitter 32 may include hardware and/or software that enable the sending and/or receiving of data messages through a communications link. The communications link may include satellite, cellular, infrared, radio, and any other type of wireless communications. Alternatively, the communications link may include electrical, optical, or any other type of wired communications, if desired. In one embodiment, onboard controller 30 may be omitted, and central controller 20 may communicate directly with load sensor 26 and/or locating device 28 via transmitter 32, if desired. Alternatively, each of load sensor 26 and locating device 28 could include its own dedicated transmitter such that a common onboard transmitter is unnecessary.

INDUSTRIAL APPLICABILITY

The disclosed control system may be useful for tasks involving the transportation of large, awkward, loose, and/or heavy loads. The control system may provide ways to detect information about lost load material, and ways to address the loss. In particular, the disclosed control system may be used to detect when a load has been lost, and to either use the lost load material to repair an existing worksite condition or to stockpile the material. This material-use decision may be made based on a variety of factors, including cleanup machine availability, capability, and cost, as well as a value of performing the repair. Operation of control system 24 will now be described with reference to FIG. 3.

Operation of control system 24 may begin by detecting that payload material of haul machine 12b has been lost or that material was lost during loading of haul machine 12b by cleanup machine 12a (Step 300). As described above, central controller 20 may determine that material has been lost based on signals from load sensor 26. For example, a sudden change in a detected contour of worksite 10 immediately around haul machine 12b may be indicative of material falling from haul machine 12b onto the surface of worksite 10. In another example, a sudden reduction in a monitored mass of material supported by haul machine 12b may be indicative of a loss in load. In yet another example, a sudden change in geometry depicted in images captured of the area surrounding haul machine 12b may be indicative of a lost load. Other ways to determine that the load has been lost may also be possible. Signals generated by load sensor 26 may be communicated via transmitter 32 offboard and received at central controller 20. Unless a signal indicative of material being lost is received at central controller 20, control may cycle through step 300.

Upon receiving a signal indicative of material being lost from haul machine 12b (or during loading of haul machine 12b), central controller 20 may determine a quantity of the material lost and a location at which the material was lost (Step 305). The quantity of lost material may be determined based on a value of the signal from load sensor 26, while the location may be determined based on correlation of the load loss signal with the location signal from location device 28 that was generated at the time that the material was determined to have been lost. In other words, central controller 20 may correlate the load loss signal with the location signal to determine when the material was lost from haul machine 12b.

Central controller 20 may then compare the quantity of lost material with a threshold amount and determine if a cleanup machine 12a, 12c, 12d is available to remove the lost material (Step 310). If the amount of material lost from haul machine 12b is less than the threshold amount, the lost material may not result in a significant deterioration in operations at worksite 10 and may not represent a significant financial loss. In other words, when the amount of material lost from haul machine is small, the material may not interfere with normal movements of machines 12 and may not be worth retrieving. Further, if no cleanup machines 12a or 12c are available to remove the lost material, nothing can presently be done about the material. Accordingly, if either of the conditions of Step 310 are not true, control may return to step 300.

However, when the amount of lost material is greater than the threshold amount and at least one cleanup machine 12a, 12c, 12d is available to remove the material, central controller 20 may determine the best way to retrieve and use the lost material. In particular, central controller 20 may determine if there are any repairs needed at worksite 10 that could benefit from the lost material (Step 315). This determination may be made via reference to the map stored in memory and based on the quantity and location of the lost material. For example, central controller 20 may determine, based on information contained in the map, if there are any potholes, ruts, depressions, or washouts previously reported and mapped that could be filled with the material that fell from haul machine 12b. If no such repairs are needed, an available cleanup machine 12a, 12c, 12d may be dispatched to simply haul the material to dump location 16 (Step 330). The decision regarding which cleanup machine 12a, 12c, 12d to dispatch may be made based on the availability of the machines, a capability of the machines, a location of the machines, and/or an operational cost of the machines. For example, the most readily available cleanup machine that is closest to the loss location, that is capable of removing the material and that is cheapest to operate, may be dispatched to remove the material. Any known priority ranking system may be utilized to make this decision, as desired. The location of cleanup machines 12a, 12c, 12d may be provided via locating devices 28, while the availability may be communicated by the operator and/or onboard controller 30 of each machine. The capability and operational cost of each machine may be known by central controller 20.

If, at step 315, central controller 20 determines that the amount of material lost from haul machine 12b is significant (i.e., greater than the threshold amount) and that a repair is needed that could benefit from the lost material, central controller 20 may then determine a cost of performing the repair and a value of the repair (Step 320). Specifically, central controller 20 may determine which of cleanup machines 12a, 12c, 12d is most capable of removing the lost material from travel route 18, which of cleanup machines 12a, 12c, 12d is closest to the loss location, which of cleanup machines 12a, 12c, 12d would be the least expensive to operate, and/or which of cleanup machines 12a, 12c, 12d would be fastest to task with the removal. Central controller 20 may then determine a time cost and a material cost of the repair when performed by that particular machine 12a, 12c, 12d, as well as a value of the repair. The value of the repair may be determined by examining how productivity may be affected by the repair, how machine wear may be affected, how operator comfort may be affected, etc.

Central controller 20 may then compare the cost of repair to the value of repair (Step 325). Only when the cost of the repair is less than the value by at least a desired margin, may controller 20 conclude that the repair should be made and task the chosen cleanup machine 12a, 12c, 12d to make the repair (Step 335). When the cost of the repair is not less than the value by at least the desired margin, central controller 20 may instead task the chosen cleanup machine 12a, 12c, 12d with only removal of the lost material to dump location 16 (Step 330). After completion of steps 330 and 335, control may return to step 300.

The disclosed control system may provide significant benefit following loss of a load from a haul machine. In particular, the disclosed control system may determine when the loss of the load is significant enough to address, and whether it makes more financial sense to use the lost material to make a necessary repair or to stockpile the material. The disclosed control system may then task the appropriate machine to address the loss, thereby providing the greatest impact to productivity and profitability.

It will be apparent to those skilled in the art that various modifications and variations can be made to the control system of the present disclosure. Other embodiments of the method and system will be apparent to those skilled in the art from consideration of the specification and practice of the control system disclosed herein. It is intended that the specification and examples be considered as exemplary only, with a true scope of the disclosure being indicated by the following claims and their equivalents.

What is claimed is:

1. A control system for a worksite at which a haul machine and at least one cleanup machine are located, the control system comprising:
   at least one sensor located onboard the haul machine and configured to generate a first signal indicative of a load of material lost from the haul machine;
   a locating device configured to generate a second signal indicative of a location of the haul machine at the worksite; and
   a controller in communication with the at least one sensor and the locating device, the controller being configured to:
      determine a location at which the load of material was lost from the haul machine based on the first and second signals;
      determine a quantity of the load of material lost from the haul machine;
      determine a repair needed at the worksite;
      calculate a value of performing the repair; and
      selectively dispatch the at least one cleanup machine to perform the repair or to move the load of material lost from the haul machine to a stockpile location based on the value of the repair.

2. The control system of claim 1, wherein the controller is configured to:
   determine an availability of the at least one cleanup machine to perform the repair or to move the load of material; and
   selectively dispatch the at least one cleanup machine based on the availability.

3. The control system of claim 2, wherein the controller is further configured to:
   determine a cost of the repair; and
   selectively dispatch the at least one cleanup machine based also on the cost of the repair.

4. The control system of claim 3, wherein the controller is configured to dispatch the at least one cleanup machine only when the quantity of the load of material lost from the haul machine is greater than a threshold quantity and the at least one cleanup machine is available.

5. The control system of claim 4, wherein the controller is configured to dispatch the at least one cleanup machine to perform the repair only when the value of the repair is greater than the cost of the repair by at least a desired margin.

6. The control system of claim 3, further including a locating device configured to generate a third signal indicative of a location of the at least one cleanup machine, wherein the controller is configured to determine the cost of the repair based on the third signal.

7. The control system of claim 6, wherein the controller is configured to determine the cost of the repair based also on a type of the at least one cleanup machine available to perform the repair.

8. The control system of claim 7, wherein the controller is configured to determine the cost of the repair based also on the location at which the load of material was lost from the haul machine and the quantity of the load of material.

9. The control system of claim 1, wherein the controller is configured to determine the location at which the load of material was lost from the haul machine by correlating the first signal with the second signal generated at a time of the loss.

10. The control system of claim 1, wherein the controller is further configured to determine the quantity of the load of material lost from the haul machine based on the first signal.

11. A control system for a worksite at which a haul machine and at least one cleanup machine are located, the control system comprising:
   at least one sensor located onboard the haul machine and configured to generate a first signal indicative of a load of material lost from the haul machine;
   a first locating device configured to generate a second signal indicative of a location of the haul machine at the worksite;

a second locating device configured to generate a third signal indicative of a location of the at least one cleanup machine; and a controller in communication with the at least one sensor, the first locating device, and the second locating device, the controller being configured to:
- determine a location at which the load of material was lost from the haul machine based on the first and second signals;
- determine a quantity of the load of material lost from the haul machine based on the first signal;
- determine a repair needed at the worksite;
- determine an availability of the at least one cleanup machine to perform the repair or to move the load of material;
- calculate a value of performing the repair;
- determine a cost of the repair;
- selectively dispatch the at least one cleanup machine to perform the repair only when the quantity of the load of material lost from the haul machine is greater than a threshold quantity, the at least one cleanup machine is available, and the value of the repair is greater than the cost of the repair by at least a desired margin; and
- selectively dispatch the at least one cleanup machine to move the load of material lost from the haul machine to a stockpile location when the quantity of the load of material lost from the haul machine is less than the threshold quantity, the at least one cleanup machine is unavailable, or the value of the repair is less than the cost of the repair plus the desired margin.

12. A method of managing a worksite, comprising:
- determining that a load of material has been lost from a haul machine;
- determining a location at which the load of material was lost from the haul machine;
- determining a quantity of the load of material lost from the haul machine;
- determining a repair needed at the worksite;
- calculating a value of performing the repair; and
- selectively dispatching a cleanup machine to perform the repair or to move the load of material lost from the haul machine to a stockpile location based on the value of the repair.

13. The method of claim 12, further including determining an availability of the cleanup machine to perform the repair or to move the load of material, wherein selectively dispatching the cleanup machine includes selectively dispatching the cleanup machine based on the availability.

14. The method of claim 13, further including determining a cost of the repair, wherein selectively dispatching the cleanup machine includes selectively dispatching the cleanup machine based also on the cost of the repair.

15. The method of claim 14, wherein selectively dispatching the cleanup machine includes selectively dispatching the cleanup machine only when the quantity of the load of material lost from the haul machine is greater than a threshold quantity and the cleanup machine is available.

16. The method of claim 15, wherein selectively dispatching the cleanup machine includes selectively dispatching the cleanup machine only when the value of the repair is greater than the cost of the repair by at least a desired margin.

17. The method of claim 14, further including determining a location of the cleanup machine, wherein determining a cost of the repair includes determining a cost of the repair based on the location of the cleanup machine.

18. The method of claim 17, further including determining a type of the cleanup machine available to perform the repair, wherein determining a cost of the repair includes determining a cost of the repair based on the type of the cleanup machine.

19. The method of claim 18, wherein determining the cost of the repair includes determining the cost of the repair based also on the location at which the load of material was lost from the haul machine and the quantity of the load of material.

20. The method of claim 12, wherein determining the location at which the load of material was lost from the haul machine includes correlating a location of the haul machine with the lost load of material at a time when the load of material is determined to have been lost.

* * * * *